Figure 1:
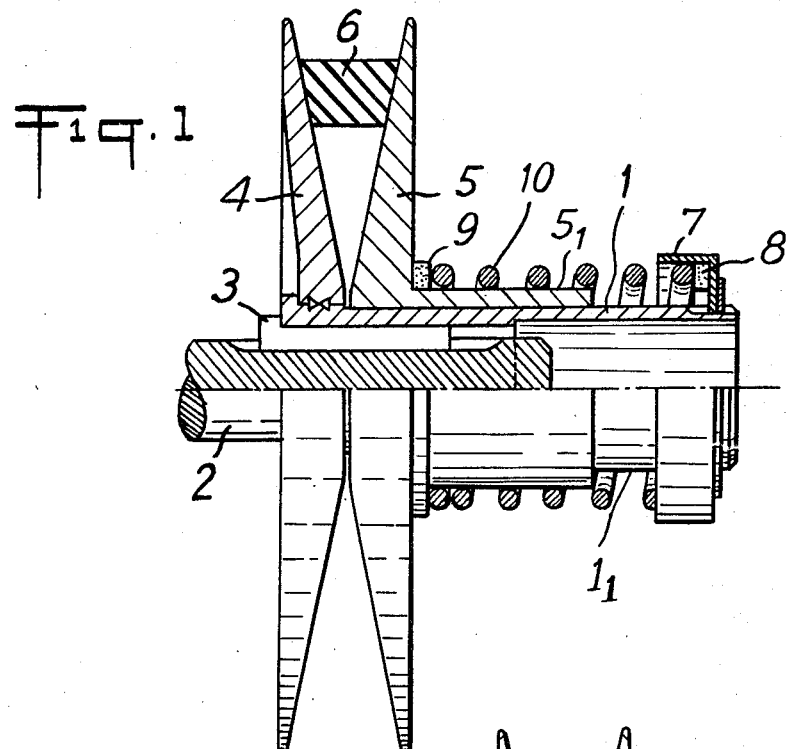

United States Patent
Boissin

[15] 3,709,051
[45] Jan. 9, 1973

[54] VARIABLE DIAMETER PULLEY
[72] Inventor: Jean Boissin, Parly, France
[73] Assignee: Pneumatiques, Caoutchouc Manufacture et Plastiques Kleber-Colombes, Colombes, France
[22] Filed: April 22, 1970
[21] Appl. No.: 30,796

[52] U.S. Cl. ..........................................74/230.17 M
[51] Int. Cl. ................................................F16h 55/52
[58] Field of Search .............74/230.17 TL, 230.17 C

[56] References Cited

UNITED STATES PATENTS

| | | |
|---|---|---|
| 3,444,749 | 5/1969 | Ruprecht et al. ....74/230.17 C |
| 2,475,954 | 7/1949 | Gerbing...............74/230.17 C |
| 2,896,461 | 7/1959 | Grevich ..............74/230.17 C |
| 3,142,997 | 8/1964 | Rampe................74/230.17 C |
| 3,358,520 | 12/1967 | Heydlauf et al.....74/230.17 C |

Primary Examiner—C. J. Husar
Attorney—Holcombe, Wetherill & Brisebois

[57] ABSTRACT

A variable diameter pulley for transmitting variable speed drive by a trapezoidal belt has a first cheek rigid with the pulley boss and a second cheek rotatable with and axially slidable along the boss, a first friction washer abutting against the side of the slidable cheek remote from the fixed cheek, and a second friction washer housing in a cup mounted rigidly on the end of the boss remote from the slidable cheek, and a helical spring arranged around the boss and abutting at one end against the first washer and at the other end against the second washer.

10 Claims, 4 Drawing Figures

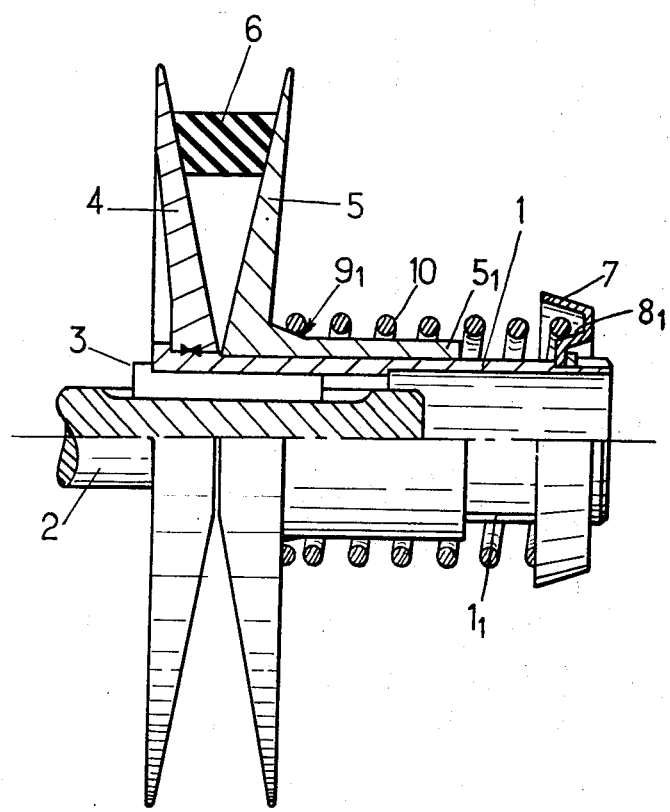
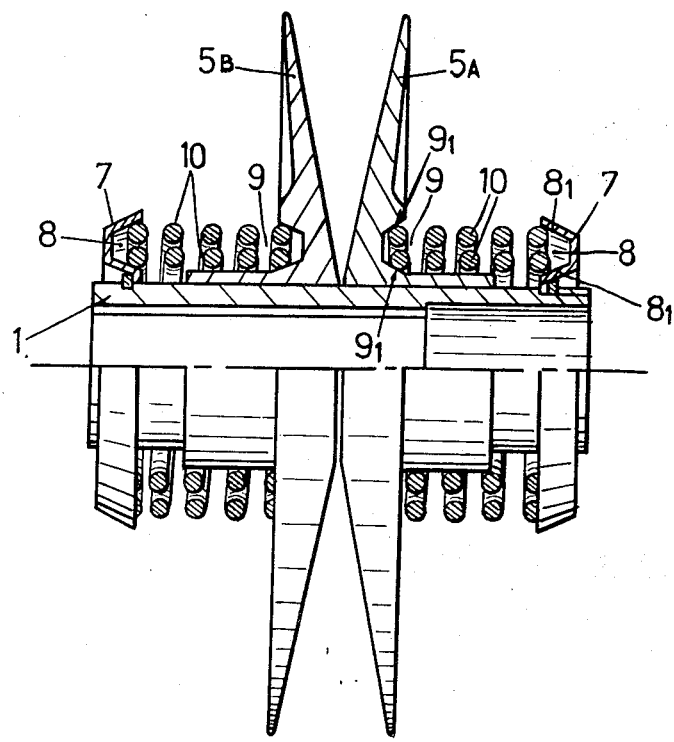

VARIABLE DIAMETER PULLEY

This invention relates to a variable diameter pulley for transmitting variable speed drive by means of a trapezoidal belt.

Pulleys of this kind generally comprise a conical cheek rigidly fixed in respect of rotation and translation on a boss and a conical cheek which can slide axially on the boss and is connected rotatably with it by grooves or by longitudinal keying. More generally the axially movable cheek is urged towards the fixed cheek by a helical spring surrounding the boss in order to grip the belt laterally between the two cheeks.

The rotatable driving of the movable cheek by a sliding key or by grooves has the disadvantage of necessitating accurate and difficult manufacture and of distorting the distribution of sliding load on the bearing surfaces of the boss and the cheek. Due to the play necessary for the sliding movement of the movable cheek and the vibrations which are inevitably produced during operation, there can very rapidly be caused corrosion of the contact surfaces which may cause jamming of the cheek on the boss especially when the speed variations are not frequent and the movable cheek therefore remains fairly stationary in the axial direction.

It has already been attempted to simplify the manufacture of such pulleys by eliminating the sliding key or the grooves between the movable cheek and the boss, their bearing surfaces being then completely cylindrical. In this case the rotatable drive of the movable cheek is ensured either by a return spring the ends of which are secured to the boss and to the cheek, the spring operating in torsion, or by other means such as fingers or rods slidable parallel to the axis, but the latter system is also as complicated and delicate as the system of keying or grooves. In any case it is necessary for some play to exist between the boss and the movable cheek in order to permit sliding, and the risk of corrosion of the cylindrical bearing surfaces is thus hardly decreased.

The invention therefore has the object, not only of simplifying the construction of pulleys of this kind while eliminating sliding keys or grooves between the boss and the movable cheek, but above all of preventing corrosion of the contact surfaces. For this purpose the return spring and the rotational driving of the sliding cheek is associated with a friction drive device causing, between the said sliding cheek and the boss, a small relative rotational movement thereby preventing corrosion of the bearing surfaces of the boss and the cheek.

Another advantage of this friction drive is to provide a coupling which is less abrupt than a positive transmission by permitting, when starting, a certain extent of sliding movement between the movable cheek and the boss. The pulley thus acts as a limiting device for the couple when the latter exceeds a given value and this effect may be more especially obtained when, according to a particular aspect of the invention, the pulley comprises two axially movable cheeks and rotatably connected with the boss by means of a friction driving device.

The invention is described below in greater detail with reference to the accompanying drawings in which FIGS. 1–4, show by way of example and in semi-sectional elevation, four embodiments of the invention.

The pulley shown in the drawings may be used as a driving pulley or as a receiving pulley but for convenience the description mainly considers the case of a driving pulley while assuming that the device for controlling the speed variation is placed on a corresponding receiving pulley, not shown.

In FIG. 1 a pulley comprises a boss 1 fixedly mounted in rotation and translation on a drive shaft 2, for example by a conventional key 3 so as to form a rigid assembly not susceptable to internal vibrations. The boss 1 may thus be integral with the shaft 2. The boss 1 carries a conical cheek 4 fixed in translation and rotation with respect to the boss 1 and a conical cheek 5 simply engaged on the external smooth cylindrical part $1_1$ of the boss on which it is therefore free to turn and to slide axially. The movable cheek 5 is extended by a cylindrical sleeve or shank $5_1$ so as to present a sufficient bearing surface on the cylindrical part 1 of the boss.

The two cheeks 4 and 5 form between them a cavity in which is positioned a trapezoidal transmission belt 6 the radius of curvature of which determines the spacing of the cheeks as is well known. At the end of the shaft opposed to the fixed cheek 4 is secured an abutment cup 7 in the base of which is housed a friction washer 8 of suitable material. Another friction washer 9 is centered around the shank $5_1$ of the movable cheek 5 and a helical compression spring 10 concentric with the boss is interposed between these two washers in such a way as to urge them respectively against the bottom of the member 7 which is integral with the boss in rotation and against the external plane surface of the movable cheek 5.

In this pulley, rotational movement of drive shaft 2 is transmitted directly to the boss 1 and the fixed cheek 3. From the fixed cheek this movement is transmitted to the belt 6 which is gripped laterally between the fixed cheek 4 and the movable cheek 5 by the return spring 10.

In the view of the interposition of the friction washers 8 and 9 the rotational movement is also transmitted to the movable cheek 5 but only within the limit of the load which can be transmitted by these friction washers, a load which varies according to the nature of the contact surfaces between the washers and their bearing surfaces on the cheek and on member 7. These washers may all be of the same material and they may all have the same contact surface.

In operation, the couple to be transmitted from the drive shaft 2 to the belt 6 is distributed in about equal proportions on each cheek 4 and 5. By means of the friction drive device there is produced between the boss 1 and the movable cheek 5, either a slow and continuous rotational sliding, or occasional rotational sliding, or again torsional oscillations which prevent corrosion of the contact surfaces between these two members even in the case when the movable cheek 5 is relatively stationary in the axial direction, that is to say when the speed variations which cause sliding of this cheek are infrequent. Moreover, at each starting operation, the part of the driving couple transmitted to the movable cheek 5 tends to exceed the couple which can be transmitted by the friction washers (8–9) so that sliding of the movable cheek is important. This sliding prevents the initiation of corrosion which may arise between the bearing surfaces of the boss 1 and the cheek 5 and causes the pulley to operate as a slipping clutch.

Finally this sliding becomes absorbed and in normal operation is very small and does not modify in any way the characteristics of the drive transmission. By a suitable choice of dimensions and shape, the sliding can be kept down to less than the operational sliding of the belt or the electric motor. The boss 1 and the shank of cheek 5 then function as a smooth bearing at slow speed and it is sufficient to choose contact surfaces of suitable material of which several are available. For example the boss 1 may be of steel and the cheek 5 of anodized aluminum. The sliding of the cheek 5 relative to the boss 1 is effected in the following manner;

1. The friction material used for the washers 8 and 9 is chosen in such a way that its static coefficient of friction is at the limit of adhesion for the nominal couple which they have to transmit.

2. There is caused, as a function of the vibrations a phenomenon well known to manufacturers of friction material when the factor of safety is not sufficiently high and relative speeds are low, i.e. that of chattering. There is constant movement from the coefficient of static friction to the coefficient of dynamic friction and vice versa, and therefore from the static state to the dynamic state. The frequency being very rapid and the vibrations very weak, the sliding amplitude is therefore small.

Vibrations for a pulley, even when balanced, are inevitable and give rise to a turning couple on the movable cheek caused by the reaction of the belt which takes up the sliding play on each alternate movement. One can therefore define a sliding zone corresponding to the ratio of the coefficient of static to dynamic friction, multiplied by a coefficient K which is a function of the vibrations and their regularities of the couple. The sliding zone is accordingly more extensive, the greater is the difference between the dynamic and static coefficient of friction. It is necessary nevertheless, to limit the relative sliding values to low magnitudes in order that it shall remain under control, that it to say, in practice less than 1 percent.

3. The transmission of the couple to the movable cheek is effected through the intermediary of a return spring 10, the latter operating in torsion and its angle of torsion depends on the couple to be transmitted. There is produced as a function of the irregularities of the couple, torsional vibrations in the elastic system which cause the torsional couple to exceed momentarily the static couple which can be transmitted by the friction material; sliding therefore occurs when the couple provided by the elastic system returns to a value less than the dynamic couple which can be transmitted by the friction washers and the elastic system then again becomes stationary. The torsional vibrations act so as to amplify the zone of sliding. The sliding zone is thus related to the zone of operation.

In the case of weak couples the device is still useful if operation is accompanied by frequent stopping or speed variations.

Figure 2:
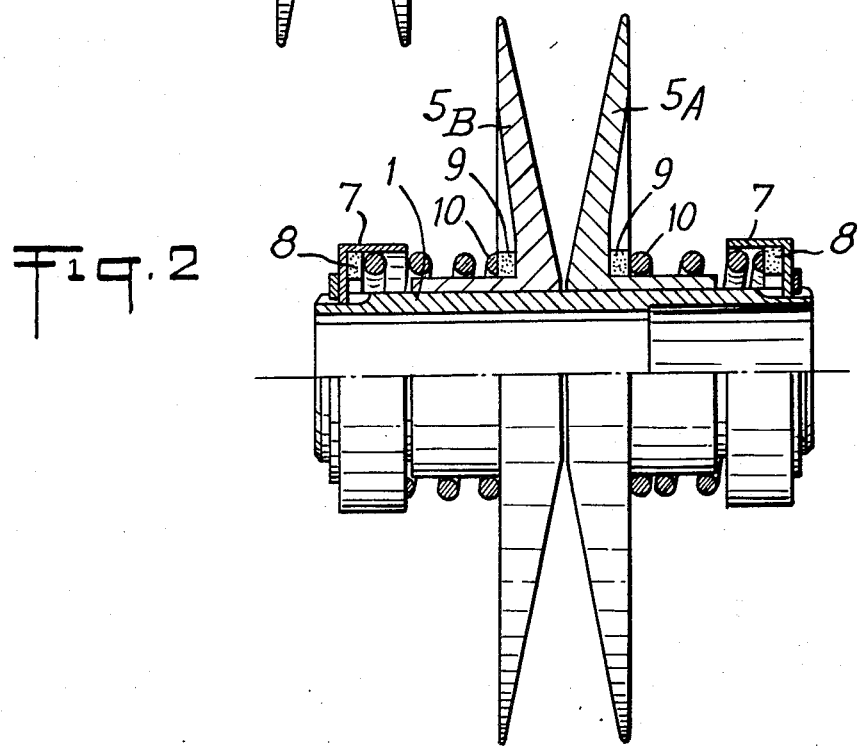

FIG. 2 shows another form of embodiment of the invention as applied to a pulley comprising two movable cheeks 5A and 5B mounted freely in respect of translation and rotation on a fixed boss 1 secured axially to a cylindrical and externally smooth bearing surface.

Each cheek is subjected to the action of a return spring and is rotatably driven from the boss by a friction drive device comprising washers 8, 9 similar to those used in the pulley of FIG. 1. Preferably the arrangement is wholly symmetrical so that the sliding movement when starting and in operation affects both cheeks at the same time. This arrangement presents, when starting, the advantage of reducing sliding between the cheeks and the belt and of transmitting the sliding between the frictional surfaces and between the cylindrical bearing surfaces of the boss and the cheeks, so that a more gradual starting effect and a more effective prevention of corrosion of the contact surfaces is obtained.

FIG. 3 represents another embodiment derived from FIG. 1 and in which the friction washers are eliminated. In this case spring 10 abuts against conical surfaces $8_1$ and $9_1$ of the cheek 5 and the member 7. For this purpose the end turns of spring 10 are preferably shaped so as to form circular rings bearing uniform against the periphery of the conical surfaces.

In this pulley rotational movement of the drive shaft 2 is transmitted directly to the boss 1 and fixed cheek 4. From the fixed cheek this movement is transmitted to belt 6 which is gripped laterally between the fixed cheek 4 and the movable cheek 5 by the return spring 10. The rotational movement of the boss is also transmitted to the movable cheek 5 by means of member 7 and spring 10, but only within the limit of the load which can be transmitted tangentially by friction between the contact surfaces of the spring 10 and the conical surfaces $8_1$ and $9_1$ of the member 7 and the cheek. The value of this tangential load may be chosen as a function of the couple to be transmitted, according to the angle of the conical surfaces $8_1$ and $9_1$ and the coefficient of friction of the materials in contact. By varying the angle of the conical surfaces and suitably choosing the materials in contact it is thus possible to adapt the maximum tangential load which can be transmitted by spring 10 beyond that produced by sliding, without having to modify the characteristics of resistance to compression of the spring itself, and consequently without altering the actual load exerted by this spring on cheek 5 and belt 6. Moreover, in view of the gripping effect of the spring on the conical surfaces $8_1$ and $9_1$ this tangential load can be relatively high with a system of small diametral dimensions.

The frictional drive device of the pulley above described may evidently incorporate modifications in particular for the purpose of adapting the magnitude of the tangential load which can be transmitted by the spring 10. Thus the conical surfaces $8_1$ and $9_1$ and/or the corresponding contact surfaces of the spring 10 may be provided with suitable fittings of friction material. The end turns of the spring 10 can also be formed so as to present corresponding conical contact surfaces to the conical surfaces $8_1$ and $9_1$. The end of spring 10 may be secured either to the cheek 5 or to the member 7 or to the boss 5 in such a way that the frictional drive is localized between the other end of the spring and the cheek on the member 7. Instead of having a single conical surface $8_1$ or $9_1$ on the member 7 and on the cheek it is possible to have on one or the other, or on both, a groove with conical cheeks, the extreme end of the spring 10 then abutting on the cheeks of this groove. One embodiment of this type is illustrated in FIG. 4 for the pulley described below.

This pulley comprises two movable cheeks 5A and 5B freely mounted in respect of translation and rotation on a boss 1 having an external smooth cylindrical bearing surface. Each cheek is driven from the boss 1 by a friction drive device comprising in this case, two concentric helical springs 10 the end turns of which are circularly formed and engaged in the grooves 8 and 9 provided in the member 7 and the cheek 5. These grooves have conical sides $8_1$ and $9_1$ on which abut respectively the end turns of spring 10. Preferably the arrangement is completely symmetrical so that the sliding movement when starting and during operation affects both cheeks at the same time. This arrangement has, when starting the advantage of reducing sliding movement between the cheeks and the belt and of distributing this sliding movement between the friction surfaces and between the bearing surfaces so as to provide a more gradual starting effect and a more effective prevention of corrosion of the contact surfaces.

The modifications indicated above in respect of FIG. 3 are also applicable to the pulley of FIG. 4. Moreover, in both cases it is possible to replace the helical spring or springs 10 by some other equivalent resilient member, for example of rubber.

We claim:

1. A variable diameter pulley for transmitting variable speed drive by a trapezoidal belt, comprising a boss, a first cheek fixed to the boss, a movable cheek slidable axially of and rotatable with respect to said boss, friction drive means between said boss and said movable cheek and comprising a resilient spring member arranged to urge said sliding cheek axially toward said fixed cheek, the coefficient of friction of the said friction drive means between the boss and the sliding cheek being such that during the transmission of a load thereby continuous rotational movement of the said movable cheek with respect to the boss is enabled to occur whereby corrosion of the bearing surfaces between the boss and the cheek is prevented.

2. A pulley according to claim 1 in which the drive device comprises two friction washers applied respectively to the movable cheek and the boss, the spring being interposed between the two frictional washers and tending to space them apart and to urge one against said movable cheek and the other on said boss.

3. A pulley according to claim 2 wherein the said friction washers have the same friction surface.

4. A pulley according to claim 1 wherein the boss has a conical surface and the spring member abuts against and is axially slidable on said conical surface.

5. A pulley according to claim 4 wherein the spring member is a helical spring at least one end of which abuts on the associated conical surface and is formed as a circular ring.

6. A pulley according to claim 4 in which the conical face is on an abutment member integral with the boss and a second conical face is provided on the sliding cheek, one end of the spring member abutting on the conical face of the sliding cheek and the other end on the conical face of the abutment member integral with the boss.

7. A pulley according to claim 4 in which the ends of the spring are engaged in conical-sided grooves in the sliding cheek and in an abutment member integral with the boss.

8. A pulley according to claim 4 comprising two helical concentric springs each abutting on corresponding conical surfaces of the cheek and the boss.

9. A pulley according to claim 4 wherein a friction material is interposed between the contact surfaces of the spring and the cheek and between the contact surfaces of the spring and the boss.

10. A pulley according to claim 1 comprising two conical cheeks each axially movable and each rotatably connected to the boss by a frictional drive device.

* * * * *